United States Patent [19]
Fogel et al.

[11] Patent Number: 5,729,332
[45] Date of Patent: Mar. 17, 1998

[54] DEPTH IMAGE PRINTING METHOD ON PRECOATED LENTICULAR MATERIAL

[75] Inventors: Sergei V. Fogel, Rochester; Roy Y. Taylor, Scottsville, both of N.Y.

[73] Assignee: Eastman Kodak Company, Rochester, N.Y.

[21] Appl. No.: 439,397

[22] Filed: May 11, 1995

[51] Int. Cl.⁶ ............................ G03B 27/32; G03B 35/14
[52] U.S. Cl. ................................................ 355/77; 355/22
[58] Field of Search ........................ 355/22, 77; 354/112, 354/115

[56] References Cited

U.S. PATENT DOCUMENTS

| | | | |
|---|---|---|---|
| 1,918,705 | 7/1933 | Ives | 354/98 |
| 2,039,648 | 5/1936 | Ives | 95/18 |
| 2,500,511 | 3/1950 | Bonnet | 88/1 |
| 3,751,258 | 8/1973 | Howe et al. | 96/81 |
| 4,852,972 | 8/1989 | Wah Lo | 350/131 |
| 5,036,356 | 7/1991 | Lo | 355/77 |
| 5,278,608 | 1/1994 | Taylor et al. | 355/22 |
| 5,279,912 | 1/1994 | Telfer et al. | 430/17 |
| 5,349,419 | 9/1994 | Taguchi et al. | 355/22 |
| 5,373,335 | 12/1994 | Street | 355/22 X |
| 5,436,738 | 7/1995 | Manico | 358/503 |
| 5,479,270 | 12/1995 | Taylor | 355/22 X |

FOREIGN PATENT DOCUMENTS

| | | |
|---|---|---|
| 520 179 | 12/1992 | European Pat. Off. . |
| 560 180 | 9/1993 | European Pat. Off. . |
| 569 896 | 11/1993 | European Pat. Off. . |
| 570 807 | 11/1993 | European Pat. Off. . |
| 5-088311 | 8/1993 | Japan . |
| 492 186 | 9/1938 | United Kingdom . |

*Primary Examiner*—Fred L. Braun
*Attorney, Agent, or Firm*—Robert V. Wilder

[57] ABSTRACT

A method and apparatus for printing lenticular pictures includes imposing lines of information in the form of segmented images of a scene onto a light sensitive material. Alternate segments or lines are provided from different perspective views of the same scene to be printed. The light sensitive material has a transparent lenticular material attached thereto. The light sensitive material is exposed, from the side opposite the lenticular material, by light from an illuminated image. The exposure may be effected by optical projection or by contact printing or by CRT image projection or other device. A reference grid, having a pitch slightly different from the pitch of the lenticular material, is positioned on the lenticular material and is effective to cause a Moiré pattern to become visible when the lenticular material is moved relative to the light sensitive material. The Moiré pattern is used to adjust the position of the lenticular material or the negative, prior to exposure of the light sensitive material. After exposure, a reflective material is applied to the side of the light sensitive material opposite the side to which the lenticular material is attached, to provide a three dimensional print. In another example, several reference grids are used for additional accuracy of alignment.

18 Claims, 5 Drawing Sheets

DEPTH IMAGE PRINTING METHOD ON PRECOATED LENTICULAR MATERIAL

FIELD OF THE INVENTION

The present invention relates generally to image reproduction and more particularly to an improved method and system for producing three-dimensional pictures.

BACKGROUND OF THE INVENTION

There are two general methods of recording lenticular sheet three-dimensional pictures, viz, continuous methods and discontinuous methods. In a continuous method, the lenticular sheet with a photosensitive image layer affixed or clamped to the back surface is placed in a camera used to capture the image. In taking a three-dimensional picture, images of the object observed from various directions are recorded directly and continuously on the photographic plate. In a discontinuous method, a series of planar images representing different perspective views of a scene are obtained first, and they are synthesized by using a special printing device to give a lenticular picture.

The present invention pertains to printing lenticular prints using a discontinuous method. Previous discontinuous methods of printing lenticular prints from input images can be further classified into two categories, namely segmented printing and composite printing. In segmented printing, the lenticular material is utilized as an image-forming element in the exposure process. If there are separate views to be printed to comprise the lenticular print, each view is recorded on a separate negative which is placed in the negative gate of an enlarger. These multiple views could have been simultaneously exposed by a multi-lens camera such as the 3D Magic camera made by Image Technology of Norcross, Ga., which has three views, or by a single camera which is traversed in front of the scene between exposures. The enlarger is focused on a print gate with a lateral shift of the negative gate and enlarger lens establishing an angle of exposure correlated to the original angular parallax used in the camera optics.

In composite printing, the information from the various views is combined into a composite print file which is printed directly onto the emulsion by an auxiliary optical system without reliance on the lenticular face plate to focus the information. An example of this is the Kodak Depth Imaging system which uses a Kodak LVT Film Recorder to print individual lines of information sampled from the different perspective views that could come from a camera such as the 3D Magic or from computer-generated or computer-altered images. This latter system produces a higher quality image, because the focus degradation associated with the lenticular face plate does not spread the information between adjacent views during the printing process, and color control can easily be incorporated in the printer exposure mechanism using lookup tables.

After exposure and developing, the printed lines are carefully aligned with respect to the lenticular axis' orientation and the image is laminated to the back side of the lenticular face plate. This alignment procedure is facilitated by observing the Moiré patterns generated between the printed image and the lenticular sheet while shifting or rotating the print. These patterns greatly magnify the errors of very small displacements.

A segmented method of printing electronic images was previously disclosed in U.S. patent application Ser. No. 07/974,441, filed Nov. 12, 1992, entitled "CRT Printer for Lenticular Photographs". In that disclosure, the negative gate of the segmented method described earlier is replaced by a CRT screen which sequentially displays images of the multiple views. The CRT and the enlarger lens is similarly translated laterally after each view is projected on the print gate surface to establish an angle of exposure correlated to the original angular parallax used in the camera optics. However, this method still is subject to lenticular image spreading between adjacent views for the same reason as discussed earlier.

A distinct advantage of the segmented method can be realized, however, if the images are projected directly onto photosensitive emulsion which was coated on the back surface of the lenticular face plate prior to exposure. In this case the need for post-alignment and lamination of the printed image to the lenticular material is eliminated. Alignment is maintained by the angular geometry relationship between the enlarger optics and the printer gate which locates the lenticular optical surfaces.

The present invention combines the effects of composite printing image quality by directly printing the recorded image lines of information with the reduced post exposure handling of precoated lenticular material.

The present invention is also applicable if the lenticular face plate is laminated to conventional coated film prior to exposure when positioning is not critical. In this procedure, the film emulsion would be oriented to face away from the composite, and the lenticular face plate would be made thinner by an optical thickness equivalent to the optical thickness of the film base so that the lenticules would properly project the information for viewing.

The present invention describes a means for making exposures of depth image information on precoated lenticular material without reliance on using the lenticular material in the exposure chain. Therefore, the fidelity of the images will be improved with less crosstalk between adjacent recorded lines of image information and special effects such as animation or image changes will be more distinct.

The segmented printing method is generally used for mass consumer lenticular prints which are illuminated by ambient light in the viewing environment. This type of print is called a reflection print. Pre-coated lenticular material is generally manufactured for reflection print applications by including a titanium dioxide layer added behind the photographic emulsion on the backside to provide a high reflectance of diffuse light reaching it through the lenticular face plate in the viewing mode. If this titanium dioxide layer is omitted from the initial coating procedure, it can be either added later after image exposure, or reflectance achieved by some other means such as laminating or otherwise affixing a reflective material to the emulsion surface after exposure and developing, leaving the photographic emulsion remains optically recordable from the backside of the material. It is proposed to expose this emulsion from this side rather than through the lenticular side to avoid the degradation of focus discussed earlier.

The means of exposing the emulsion could be either direct contact printing from a negative made on a line recorder such as the LVT Film Recorder or by optical projection with some magnification compensation from such a negative. It would also be possible to project an image from a CRT screen as with conventional CRT printing which would allow some electronic manipulation of image location and rotation.

It is important that the lines of information be printed parallel to the lenticular axes and properly positioned with respect to their midpoints. It is therefore proposed to position a separate reference grid on the lenticular side of the coated material with a spatial pitch slightly different than the lenticular pitch so that a Moiré pattern of fringes becomes visible. This fringe pattern will greatly magnify any displacement or angular change in the position of the lenticular material from image to image and provide a feedback mechanism for repositioning the coated lenticular or the negative image prior to exposure. For setup purposes, a second reference grid can be temporarily placed in the negative gate or a reference grid printed on the negative at some place to the side of the final print format thereby allowing it to be trimmed away from the image after developing.

SUMMARY OF THE INVENTION

In one embodiment of the present invention, there is provided a method and apparatus for producing a photographic print from an illuminated image comprising the steps of affixing a lenticular material over light sensitive material, positioning the light sensitive material on an exposure plane, and effecting the exposure of the light sensitive material from the side of the light sensitive material opposite the lenticular material, by light from the illuminated image.

In another embodiment, the invention further includes the step of affixing a reflective layer to the exposed side of said light sensitive material, after exposure and development, to reflect light back through the lenticular material.

In yet another embodiment, a reference grid is arranged to be brought into contact with the lenticular side of said lenticular material so that a Moiré fringe pattern is produced, the Moiré fringe pattern being compared to said fixed reference to determine the relative positions between said lenticular material and an illuminated image or negative.

The present invention will be better understood when taken in conjunction with the following description and drawings wherein like characters indicate like parts and which drawings form a part of the present invention.

DETAILED DESCRIPTION OF THE DRAWINGS

Figure 1:
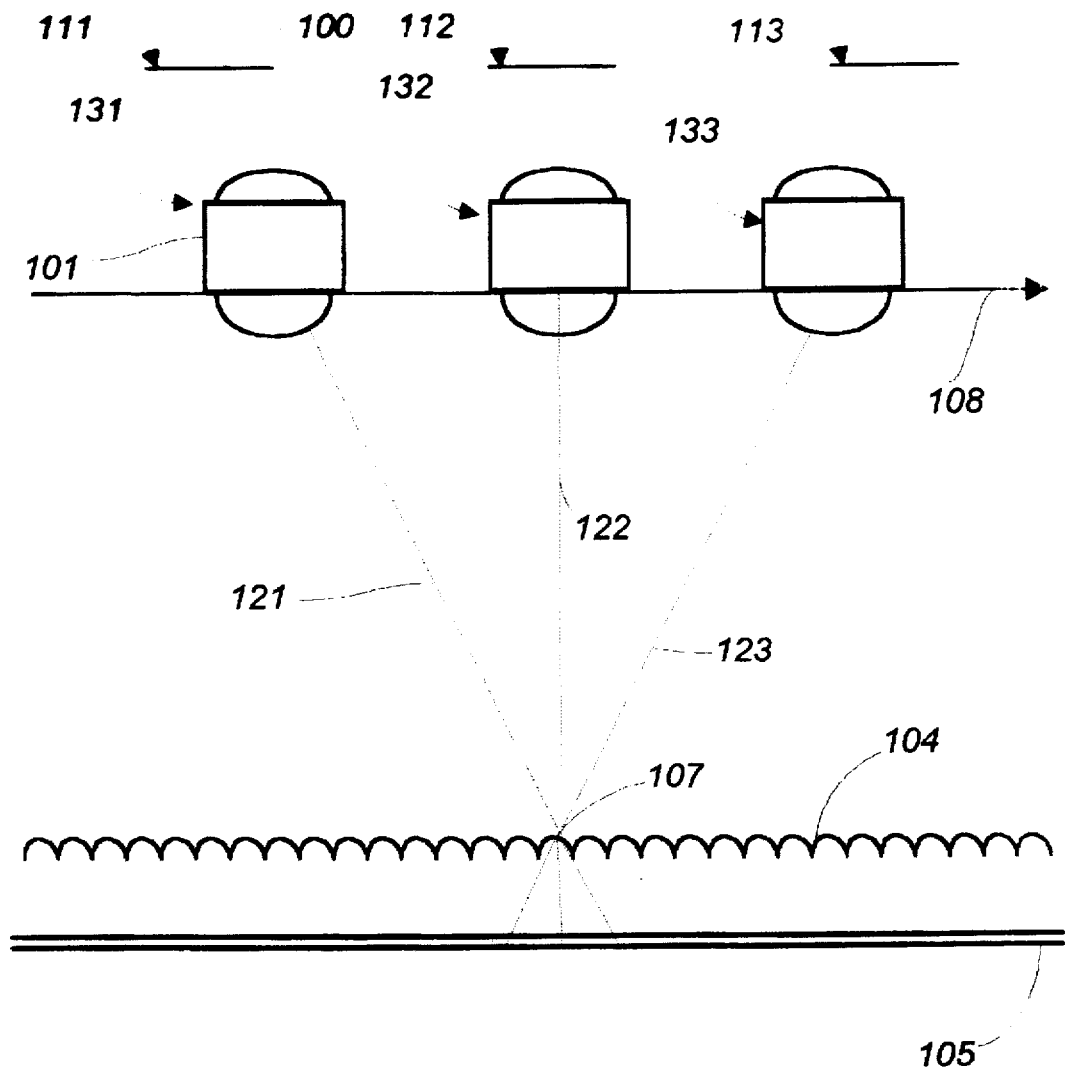
FIG. 1 shows a prior art segmented method of exposing the emulsion coating through the lenticular face plate.

With more specific reference to FIG. 1, there is shown a prior art technique of printing three-dimensional lenticular pictures on precoated lenticular material. A translatable film gate 100 is moved along a path including first, second and third positions, 111, 112 and 113, respectively. The film gate path is parallel to the plane of the precoated lenticular receiver material 104 and a projection lens 101 is moved along a mutually parallel path 108, including corresponding first, second and third locations 131, 132 and 133, respectively. At each location, an image of a negative placed in the film gate is focused onto the photosensitive layer 105 of the precoated lenticular receiver material 104 at a magnification which enlarges the negative area to match the print area. Lenticule 107 is shown for reference at the center of the print, but the principle herein described works for all lenticules in print. As the lens 101 is moved from position 131 successively to position 132 and eventually position 133, the film gate 100 follows in corresponding locations 111, 112, and 113 which maintains a coincidence of centerpoint of the film gate with optical projection paths 121, 122, and 123.

To avoid gaps of unexposed receiver material between positions 131, 132 and 133, the exposing aperture of the lens 101 along path 108 should just touch the adjacent aperture. Since physical lens apertures are typically not that large, a common technique is to traverse the lens and negative with the existing aperture held open until midway points between positions 131 and 132, and 132 and 133 have been reached, at which time, the negative is changed.

This motion can be achieved by a variety of means such as linkages, cam devices, stepper motors, or combinations thereof. Coincident with this motion, the actual negative present in the film gate is also changed, since the negatives represent differing perspective views taken at proportionally similar angles to the angles that paths 121, 122, and 123 respectively have relative to a perpendicular to the receiver material 104. These differing perspective view negatives can be provided by a movable camera on a rail or multi-lens camera such as the Nimslo camera. The quality of the image is directly affected if the alignments of: the negative within the film gate; the film to the lens; or, the lens to the lenticular; change due to machine inaccuracies or wear.

If multiple images of a given subject are desired, this elaborate printing technique must be repeated, and subsequent images become degraded as the negative wears because of the negative transfer mechanism. The number of different perspective views printed is shown FIG. 1 is three, but any number from one to n can be printed by this technique.

Figure 2:
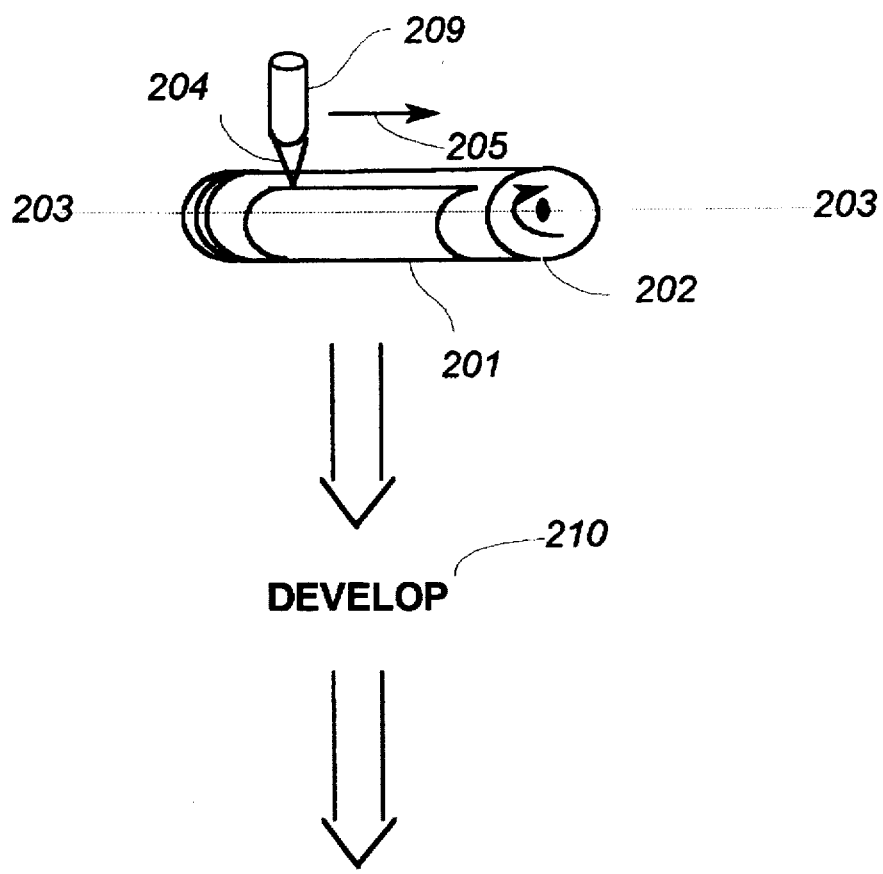
FIG. 2 shows a prior art composite method of exposing the emulsion with a film recorder.
Figure 2:
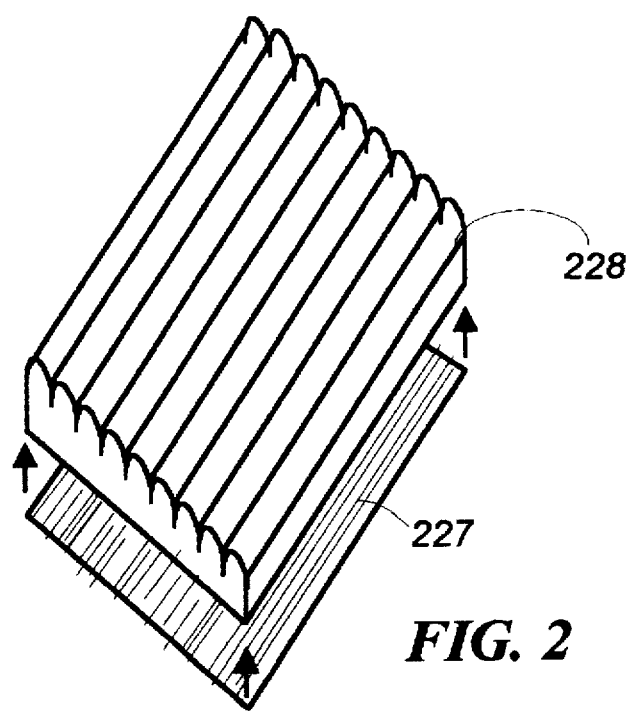

FIG. 2 shows a prior art method of exposing a photosensitive emulsion with a film recorder for later alignment and lamination. A film recorder such as the Kodak LVT Model 1620B is designed to affix a sheet of film 201 to the outside of cylindrical drum 202. The drum 202 is caused to rotated about its axis 203. A beam of exposing light is focused on the emulsion of a film sheet 201 using a microscope objective optic 204, and the exposing optical head 209 containing the optic 204 is transported along a path 205 which is parallel to axis 203 and the film surface. The amount of the exposing optics motion per revolution of drum 202 is made equal to the focused spot size on the film surface. This can be carefully maintained by changing the aperture size and shape of the beam.

As the drum rotates to new unexposed film areas, the light entering the exposing optical head 209 is modulated for color content and intensity with values corresponding to image content. Since the time rate of image modulation, the time rate of rotation and the time rate of exposing optics translation are maintained at constant values, the resultant areas of exposure to modulation profiles are substantially the same, and commonly referred to as pixels, or picture elements. The progress of pixel information with respect to image content per revolution is rapid, since with only one revolution a whole line has been exposed, and this is called the fast scan direction. The progress of pixel information with respect to image content along the exposing optics translation path 205 is slower, since each revolution of the drum only permits a translation displacement equal to the focused spot size, and this is called the slow scan direction.

The data providing the changing modulation control signals are provided by a control computer not shown, but a composite print file containing interleaved scan data from negatives provided can be suitably used to adjacent fast scan lines which correspond to the imaged lines from the optical paths 121, 122, 123 in FIG. 1. The film sheet 201 can be developed, shown as process 210, to become film sheet 227 and aligned and laminated to a lenticular screen 228 of suitable lenticular spacing and thickness to accomplish the same final viewing projection task as faceplate 104 does. There can also be a laborious chain of events to produce a final depth image and the final quality subject to the accuracy of aligning and lamination. It has also been demonstrated in prior art that the film sheet 201 can be comprised of negative material and that an additional contact printing operation can be inserted after developing 210 to provide contact print copies 227 for final assembly. The quality of image produced by this process is better than that illustrated in FIG. 1, because of the effects of the lenticular sheet as an optical imager are excluded.

Figure 3:
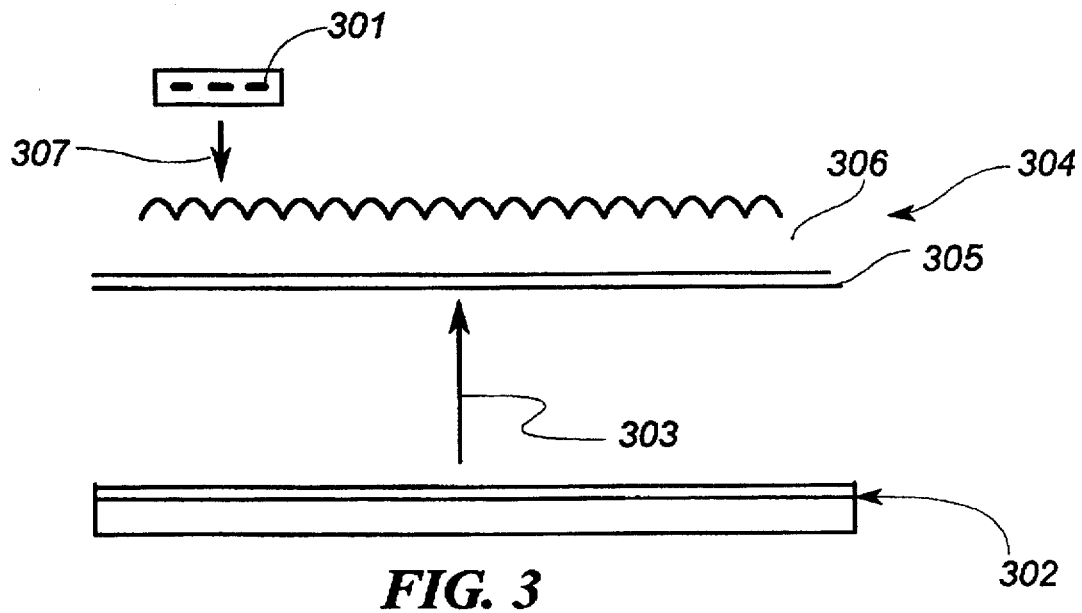
FIG. 3 shows the proposed method of exposing the emulsion from the back side by contact printing using a composite negative.
Figure 6:
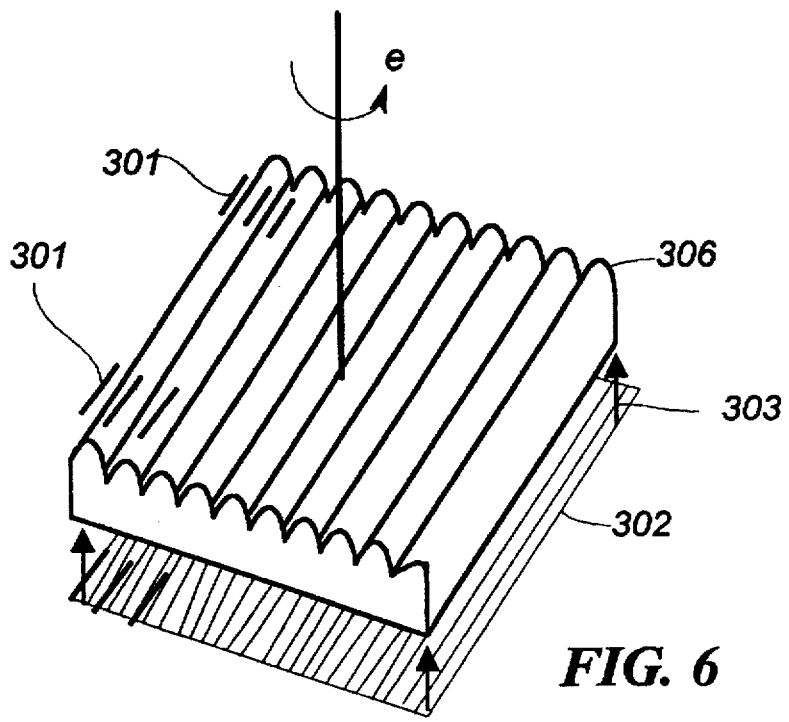
FIG. 6 shows a perspective view of the lenticular material and related Moiré pattern.

FIG. 3 shows the proposed method of exposing the emulsion from the back side by contact-copying a composite negative and subsequest alignment of the receiver material for exposing. A referenced grid 301 composed of black lines and clear spaces is provided which has the same spatial pitch as the lenticules on the precoated lenticular receiver material 304. A negative produced on a film recorder as described for FIG. 2 will have multiple lines per lenticule. The relative location and rotation of the negative 302 to the reference grid 301 can be benchmarked by observing the Moiré patterns set up between the lines of the reference grid 301 and the lines on the negative 302 when the two components are translated to contact each other along paths 307 and 303 respectively. Paths 307 and 303 are made parallel by machine design and fixturing. Prior to exposing the lenticular receiver material 304, comprised of lenticular sheet 306 and photosensitive layer 305, the receiver material 304 can be aligned for position and angle to the grid 301 by bringing grid 301 in contact with sheet 306 along path 307 and adjusting until the same Moiré pattern as previously benchmarked has been achieved. Then the negative 302 can be translated along path 303 to contact the photosensitive layer 305 and an exposure made by illuminating negative 302 from the bottom side, with the assurance that the exposed lines on the negative 302 will be aligned to the lenticules of sheet 306. FIG. 6 shows the rotational motion 'e' is best measured by placing pieces of the reference grid 301 at opposite ends of the lenticular print. These areas could be located just outside the actual print area in a border. That would allow monitoring and adjusting the alignment and rotation for each print on a continuous web of precoated lenticular receiver material 306 extending in the direction of the lenticules.

Figure 4:
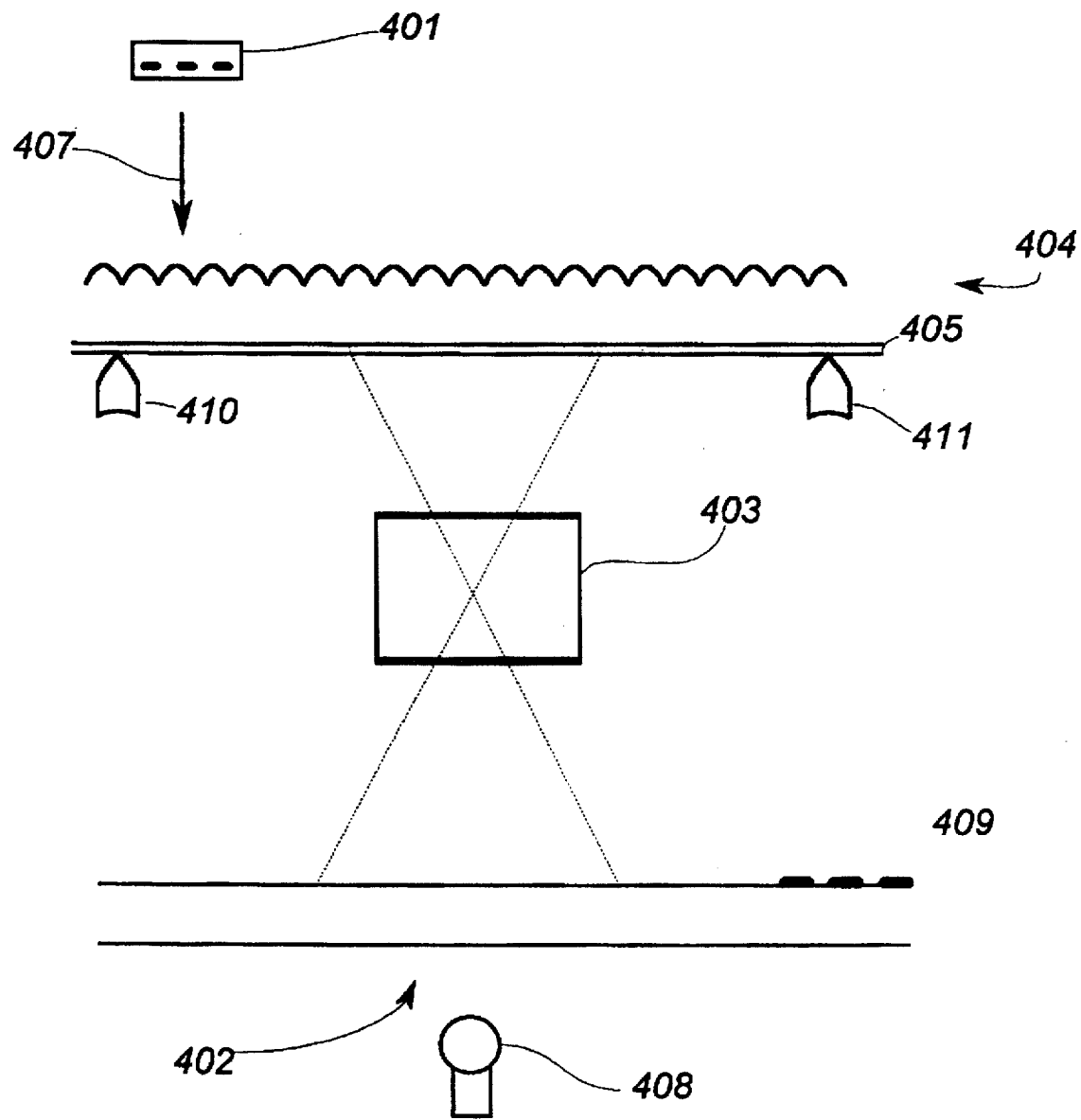
FIG. 4 shows the proposed method of exposing the emulsion from the back side by projection from a composite negative.

FIG. 4 shows the proposed method of exposing the emulsion from the back side by optical projection from a composite negative. The reference grid 401 which can be moved to a contact position with precoated lenticular receiver material 404 along path 407 can similarly be used as in the contact process described in FIG. 3 to pre-align a negative 402 similarly consisting of multiple lines per lenticule. As an additional aid to observing the Moiré & pattern, a grid pattern 409 can be printed on the negative outside the image area. A printer lens 403 is used to project the negative image onto the photosensitive emulsion layer 405. Prior to inserting the material 404 into the printing gate established by datums or markers 410 and 411, the reference grid 401 is moved to datum 410 and the Moiré pattern between it and the image of the grid pattern 409 benchmarked as described earlier. The material 404 can now be inserted in the printing gate between the markers 410 and 411, and a similar Moiré pattern achieved by adjusting the position of the material 404 for position and rotation. The light source 408 can now be turned on and the image of the negative will be printed on the layer 405.

Figure 5:
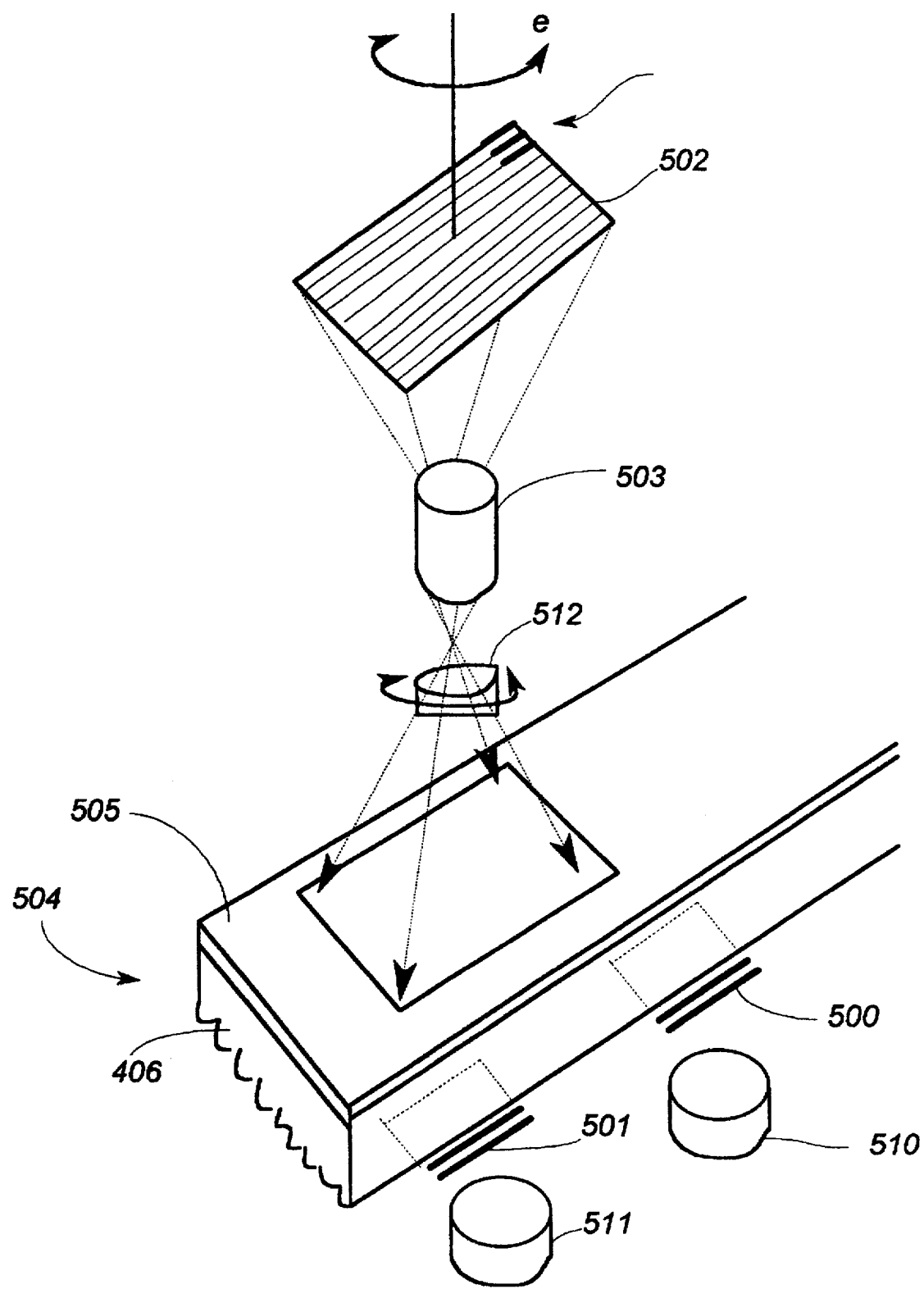
FIG. 5 shows a method of adjusting a projected image for rotation and lateral position to coincide with the orientation of the lenticular material for small errors.

FIG. 5 shows a preferred embodiment of the projection method described in FIG. 4 for a printer designed to print multiple images on a web of precoated lenticular receiver material 504. This entire apparatus is inverted from the orientation shown in FIG. 4 for the sake of drawing clarity, but the final orientation would be chosen for machine design efficiency. Lens 503 provides an image 506 of the negative 502 on layer 505. Reference grids 500 and 501 are positioned to extend beneath the receiver material 504. The grids 500 and 501 can be provided to pre-align the rotation 'e' of negative 502 as described for FIG. 4.

The Moiré pattern is benchmarked by observing the patterns with video cameras, the lenses 510 and 511 of which, are shown below the web 504. Since lateral movement of web 504 may be difficult, the image 506 of the negative 502 can be laterally shifted by using a dithering prism 512 comprised of a small wedge angle between two flat surfaces on a disk of glass. As the prism 512 is rotated, the image will deviate slightly in a direction perpendicular to the wedge surface intersection line. Therefore, the amount of lateral shift of the image can be changed by rotating prism 512.

The method and apparatus of the present invention has been described in connection with the preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention as defined by the claims.

PARTS LIST 100 film gate
101 lens
104 precoated lenticular receiver material
105 photosensitive layer
107 lenticule
108 path
111 location or position
112 location or position
113 location or position
121 path
122 path
123 path
131 position or location
132 position or location
133 position or location
201 film
202 drum
203 axis 204 objective optic
205 path
209 optical head
210 developing step
227 print copies
228 lenticular screen
301 grid
302 negative
303 path
304 receiver material
305 photosensitive layer
306 sheet
307 path
401 grid
402 negative
403 lens
404 receiver material
405 layer
407 path
408 light source
409 grid pattern
410 datum or marker
411 datum or marker
500 grid
501 grid
502 negative
503 lens
504 web
505 layer
510 lens
511 lens
512 prism

We claim:

1. A method of producing a photographic print from a negative, said method comprising the steps of:
   (a) affixing a lenticular material to a light sensitive material;
   (b) aligning the light sensitive material on an exposure plane: said step of aligning includes the step of providing an optically transmittable reference grid on the lenticular side of the lenticular material, and aligning said reference grid to a fixed reference located at a measuring position relative to the exposure plane; and
   (c) effecting the exposure of the light sensitive material from the side of the light sensitive material opposite the lenticular material, by light from the negative.

2. The invention as set forth in claim 1 and further including the step, following step (c), of:
   (d) affixing a reflective layer to the exposed side of said light sensitive material, after said light sensitive film has been exposed, said reflective layer being operable to reflect light back through the lenticular material.

3. The invention as set forth in claim 2 wherein the reflective layer is produced by applying a reflective coating to said light sensitive material.

4. The invention as set forth in claim 2 wherein the reflecting layer is produced by applying a laminate to said light sensitive material.

5. The invention as set forth in claim 1 wherein the negative and light sensitive material are arranged in contact to effect said exposure through contact printing upon the light sensitive material.

6. The invention as set forth in claim 1 wherein the negative is displaced from the light sensitive material and light is optically projected through the negative to the light sensitive material to effect said exposure.

7. The invention as set forth in claim 1 wherein said lenticular material is comprised of a plurality of juxtaposed lenticules having a first pitch, said reference grid further including a series of parallel lines having a second pitch between said lines, said second pitch being different from said first pitch such that a Moiré fringe pattern is produced, the Moiré fringe pattern being utilized to determine the relative positions between said lenticular material and the negative.

8. The invention as set forth in claim 1 wherein the lenticular material includes a planar side placed next to the light sensitive material and a lenticular side, and said step of aligning includes the step of providing at least two reference grids at positions displaced along the direction of the axes of the lenticules of the lenticular material.

9. The invention as set forth in claim 8 and further including the step of comparing the positions of fringes appearing at a predetermined fixed reference location.

10. The invention as set forth in claim 1 wherein the negative includes at least one negative reference indicium outside of the image to be viewed, said negative reference indicium being effective to produce a corresponding print reference indicium on said light sensitive material, said invention further including the step of utilizing said print reference indicium to adjust the position of the light sensitive material.

11. A method of producing a photographic print from an illuminated image, said method comprising the steps of:
   (a) positioning a light sensitive material on an exposure plane;
   (b) aligning a lenticular material over the light sensitive material, said step of aligning includes the step of providing an optically transmittable reference grid on the lenticular side of the lenticular material, and aligning said reference grid to a fixed reference located at a measuring position relative to the exposure plane; and
   (c) effecting the exposure of the light sensitive material from the side of the light sensitive material opposite the lenticular material, by light from the illuminated image.

12. The invention as set forth in claim 11 and further including the step, following step (c), of (d) affixing a reflective layer to the exposed side of said light sensitive material to reflect light back through the lenticular material.

13. The invention as set forth in claim 12 wherein the reflective layer is produced by applying a reflective coating to said light sensitive material.

14. The invention as set forth in claim 12 wherein the reflecting layer is produced by applying a laminate to said light sensitive material.

15. The invention as set forth in claim 11 wherein said reference grid is arranged to be brought into contact with the lenticular side of said lenticular material so that a Moiré fringe pattern is produced, the Moiré fringe pattern being compared to said fixed reference to determine the relative positions between said lenticular material and the negative.

16. The invention as set forth in claim 11 wherein the lenticular material includes a planer side placed next to the light sensitive material and a lenticular side, and said step of aligning includes the step of providing at least two reference grids at positions displaced along the direction of the axes of the lenticules of the lenticular material.

17. The invention as set forth in claim 16 and further including the step of comparing the positions of fringes appearing at a predetermined fixed reference location.

18. The invention as set forth in claim 11 wherein said illuminated image is produced on the screen of a CRT, and said step of positioning is accomplished through electronically changing the illuminated image on said CRT.

* * * * *